Feb. 20, 1940. D. B. REPLOGLE 2,190,678
AIR-METHOD CLEANER, ANTECHAMBER TYPE
Filed Aug. 20, 1936 2 Sheets-Sheet 1
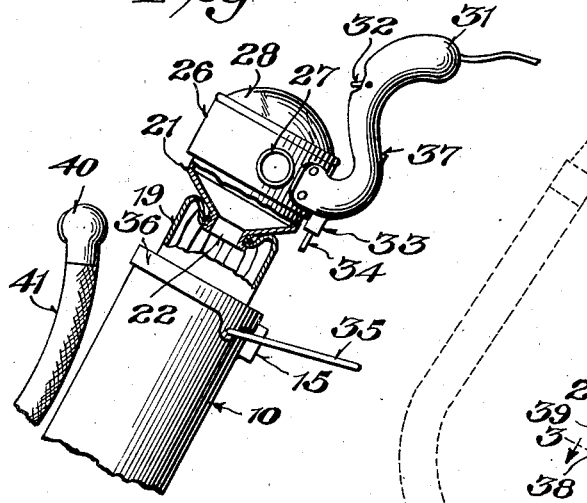
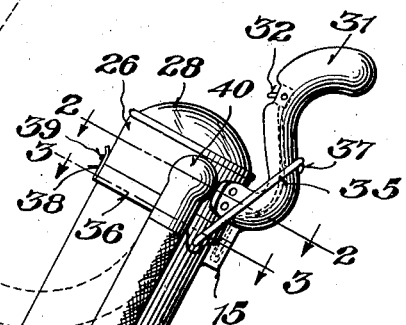
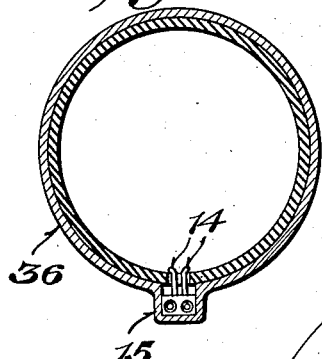
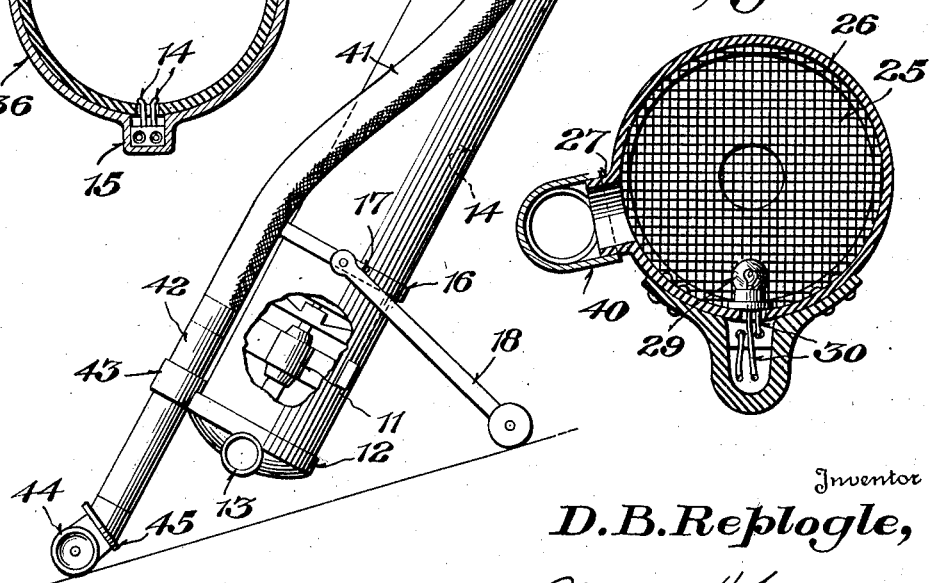
Inventor
D. B. Replogle,
By
Attorney

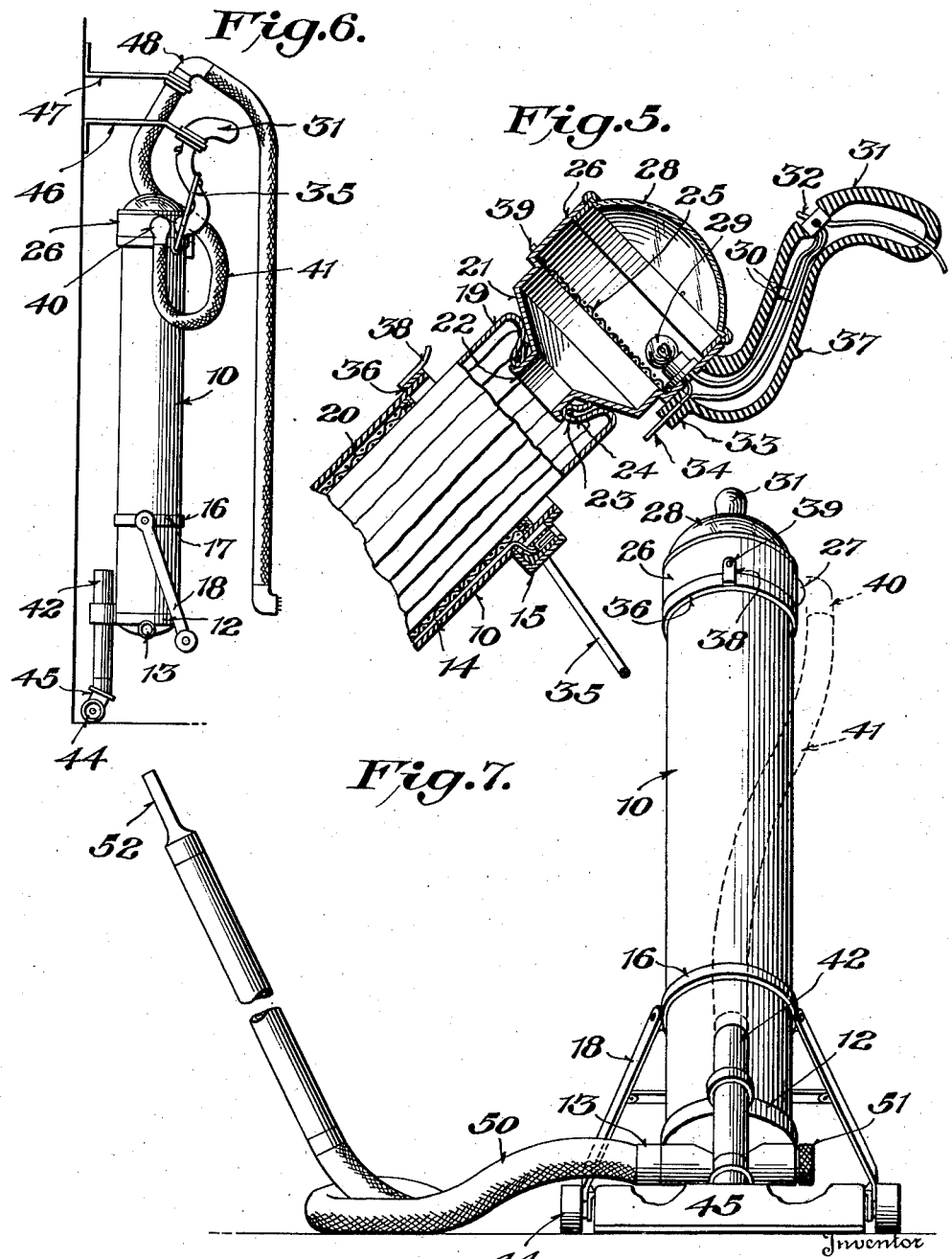

Patented Feb. 20, 1940

2,190,678

UNITED STATES PATENT OFFICE 2,190,678

AIR-METHOD CLEANER, ANTECHAMBER TYPE

Daniel Benson Replogle, Berkeley, Calif., assignor to The Ohio Citizens Trust Company, Toledo, Ohio, a corporation of Ohio, as trustee Application August 20, 1936, Serial No. 97,057

9 Claims. (Cl. 15—9)

The invention relates to cleaning apparatus and more particularly to portable electric cleaners of the air-method type wherein an elongated conduit is formed by detachably connecting a plurality of tubular elements, some of which may be rigid and others flexible, and wherein air is circulated through the conduit by means of a power plant mounted within the conduit and arranged to draw air in one direction so as to produce a partial vacuum while discharging air under pressure in the other direction. Suitable extension devices and tools for utilizing the partial vacuum or air under pressure may be employed in the system and suitable air filtering and dust collecting means will be included for the purpose of removing dust from the air. The system also includes a transparent cap through which the amount of dust entering the air filtering means may be viewed by the operator. According to the present invention the visibility is improved by provision of an electric lamp within the transparent cap.

The invention will be more readily understood by reference to the accompanying drawings and the following detailed description in which an illustrative embodiment of the inventive thought is set forth for the purpose of illustration rather than by way of limitation.

In the drawings:

Fig. 1 is a side elevation of the improved cleaner.

Fig. 2 is a section on the line 2—2 of Fig. 1.

Fig. 3 is a section on the line 3—3 of Fig. 1.

Fig. 4 is a fragmentary view of the upper portion of the cleaner with the cap partially removed and the hose extension shown separated from the cap as is the case when the cap and dust collector are being removed.

Fig. 5 is a view similar to Fig. 4 showing the parts in section.

Fig. 6 is a side elevation of the cleaner shown supported in upright position and the extension devices separated from the floor tool.

Fig. 7 is a rear view of the apparatus showing the same employed as a blower.

The cleaning system comprises in general a rigid tubular section or caddy housing a power plant at one end and an air filter at the other. A removable transparent cap is provided at the air filtering end and suction pipes are connected to the caddy at the suction end while blower pipes may be connected at the air discharge end. These pipes may be equipped with suitable working tools. The transparent cap is equipped with a lamp whereby the interior may be viewed and this cap also carries a rigid handle grip which houses the conductor cords for supplying current to the lamp. The caddy is also equipped with electric wires leading to the power plant and the arrangement is such that when the cap is applied to the caddy the electrical circuit to the power plant is completed while such circuit is broken when the cap is removed.

Referring to the drawings in detail the reference numeral 10 denotes the tubular element or caddy within which the power plant and air filtering means are housed. This tubular element is preferably rigid and cylindrical in form and is composed of light weight material of insulating character such as Bakelite or hard fiber or where metal is employed a light metal such as aluminum should be used.

At the lower end of the caddy the power plant 11 is housed. This is preferably of the multiple unit type disclosed in my application Serial No. 64,420 filed February 17, 1936, wherein a plurality of independent motors are arranged in tandem, each motor driving one or more fans, the motors preferably rotating in opposite directions about their common axis.

The discharge end of the caddy is provided with a removable cap 12 which may be secured to the body of the caddy in any suitable manner and is provided with one or more lateral discharge outlets 13. Each of these outlets should be of sufficient capacity to carry the entire output while the other outlet is capped. Current is supplied to the power plant through electric conductor cords 14 which may be located within the without the caddy. The conductor terminates at its upper end in a socket member 15.

Intermediate the ends of the caddy there is provided a strap or band 16 having a lug or stop 17. To the strap 16 is hingedly secured a bracket 18 of any suitable type but preferably of the collapsible form shown in my application Serial No. 94,653, filed August 6, 1936, entitled Air-method cleaner supports. Other forms of support may be employed, such as shown in my issued patents and pending application, as for example a flexible bail which may also serve as a skid member as set forth in my application Serial No. 96,667, filed August 18, 1936, now Patent No. 2,175,644.

The upper end of the caddy 10 houses the dust collecting element which may be of any suitable type. As shown the dust collector includes an inner bag 19 composed of porous paper which is preferably reinforced and supported by an outer receptacle or bag 20 which may be composed of cloth or other relatively coarse mesh material such as wire netting or matting, the outer receptacles serving to reinforce the inner bag and prevent bursting of the same and at the same time preventing direct contact with the wall of the caddy.

The top of the caddy is closed by a removable cap assembly having an inlet for dust laden air to which any suitable extension members may be attached. As shown the cap assembly includes a funnel shaped member 21 having a reduced neck 22 to which the mouth 23 of the paper bag 19 may be detachably secured as by means of a rubber band, string or like flexible material 24. The funnel is preferably covered over by a netting 25 which serves to prevent large objects from entering and possibly rupturing the paper bag. A cylindrical casing 26 fits over the top of the funnel and may be secured thereto as by welding or may be separable. This casing is provided with an inlet nipple 27 for dust laden air coming from any source. The cap assembly is provided with a transparent top 28 which may be removable to give access to the wire netting 25. The transparency of this top permits the operator to view the air entering the cleaner to determine the amount of dust which is carried therewith.

According to my invention an electric lamp 29 is mounted to shine within the cap assembly and serves to light the interior, which is particularly desirable where the cleaner is used in dark places. Current is supplied to the lamp through wires 30 leading from any suitable source and extending through a handle grip 31 secured to the lower side of the cap as clearly indicated in Fig 3. The handle grip may be provided with a trigger switch 32 near the upper portion thereof and adjacent the lower portion there is provided a plug 33 having prongs 34 which are adapted to be inserted in the socket 15 to supply current through the wires 14 to the fan motors of the power plant as previously described. The coaction between the plug and socket members serves to accurately place the cap upon the caddy so that the handle grip will be at all times below the cleaner. It will be noted further that the handle grip is so arranged as not to interfere with the visibility of the transparent cap.

For holding the cap in position a swinging bail 35 may be provided which is shown as pivoted to ears on a band 36 secured to the top of the caddy, such bail cooperating with the lug or lugs 37 on the handle grip 31. There may also be provided a spring catch 38 cooperating with a lug 39 on the cap.

Any tubular extension members may be connected to the inlet 27. As shown a connector member 40 preferably of rubber is attached to the nipple 27 and connects with a tubular element 41, preferably a flexible hose. The other end of the hose 41 may be swung to any desired position for cleaning purposes and may be provided with any sort of cleaning tool or extension devices. As shown in full lines in Fig. 1 the lower end of the pipe 41 is connected to a rigid tubular element 42 which in turn is shown as rigidly secured to the caddy by means of an extension socket 43 integral with the cap 12 through which socket the tubular element 42 passes. At the lower end of the tubular element 42 there may be applied any suitable floor tool 44, that shown in my Patent No. 1,994,868 dated March 19, 1935, being serviceable for this purpose. The rotary joint 45 may be included in accordance with the aforesaid patent for the purpose of varying the angular relation between the tool and the body of the caddy. The hose pipe 41 may be removed from the tubular element 42 and provided with further extension devices or tubes either rigid or flexible.

The cleaner may be supported in upright position as indicated in Fig. 6 and the hose extensions multiplied so that any part of the room may be accessible and any desired form of working tool may be applied. As shown in Fig. 6 a bracket 46 is employed for supporting the handle grip 31 to hold the cleaner in upright position and if desired a second bracket 47 may be employed for supporting the hose pipe 41, the bracket 47 carrying a connector member 48 to which is secured a hose pipe extension similar to the pipe 41. At the end of the extension pipe there may be provided a cleaner tool of the type shown in my Patent No. 1,994,871 dated March 19, 1935.

In Fig. 7 the cleaner is shown provided with a blower attachment in the form of a hose pipe 50 which may be detachably secured to one of the outlets 13, the other outlet being closed by a plug 51. It will be obvious that the plug may be interchangeably applied to the two outlets and that the blower may be attached at either side of the cleaner. The pipe 50 is shown as provided with a suitable nozzle 52 which may be employed to blow dust from inaccessible places into proximity with the suction tool.

In operation the cap assembly is fastened at the top of the caddy by means of the bail 35 and catch members 38 and 39. In this position the prongs 34 carried by the cap engage in the socket 15 carried by the caddy and current may be supplied to the motor by turning on the switch. Suction is then created which may be utilized for drawing dust laden air through the floor tool 44 or from any other source through the pipe 41 into the cap assembly where the large particles are removed by the screen 25 and the smaller particles pass into the filter bag and are retained by the porous paper, the filtered air then passing through the caddy and over the elements of the power plant cooling the same and being thence discharged through one or both of the outlets 13, to either of which blower attachments may be applied if desired.

The pipe 41 may be utilized in connection with the floor tool or may be provided for cleaning walls, furniture or the like with the use of end member extension devices.

The amount of dust being drawn into the cleaner with the air may be determined at all times by means of the transparent cap which is illuminated by the light 29. When the cleaner bag has become fouled it may be removed by lowering the bail 35 and lifting the cap with the bag as indicated in Fig. 4, using the member 31 as a handle. This member also serves as a handle for the complete cleaner for moving the same to and fro across the floor. The connector 40 and the hose pipe 41 are preferably separated from the inlet pipe 27 when the bag is being removed.

The bag 19 is then readily separable from the cap and may be replaced by a clean bag or in the case of a cloth bag the original bag may be emptied and replaced. The cap with the clean bag attached thereto is then replaced being careful that the prongs 44 fit into the socket 15 so that the electrical connection is again completed.

The invention has been described in detail for the purpose of illustration but it will be obvious that many variations and modifications may be resorted to without departing from the spirit of the invention.

I claim:

1. A suction cleaner comprising a tubular element housing air filtering and suction producing means at opposite ends thereof, a cap assembly at the air filtering end, having an inlet for dust laden air, a transparent cover for said cap assembly and an electric lamp to shine within said cap assembly whereby the quantity of dust entering the cleaner may at all times be viewed by the operator, the cap assembly being removable from the tubular element and carrying one member of a plug and socket electrical connector, while the tubular element carries the other member of said connector for supplying current to the suction producing power plant of the cleaner.

2. A suction cleaner comprising a caddy housing a suction producing means, including an electric motor, at one end and an air filtering element at the other, a removable cap assembly having an inlet for dust laden air, a transparent top for the cap assembly, an electric light for illuminating the interior of the cap, means carried by said cap for supplying current to said lamp, wires carried by the caddy for conveying current to said power plant, and a plug and socket connection, one element of which is carried by the caddy and the other by the cap assembly for connecting the wires supplying the lamp to the wires leading to the power plant when the assembly is in position upon the caddy.

3. A suction cleaner comprising a tubular element housing suction producing and air filtering elements at opposite ends thereof, a cap at the air filtering end of the cleaner having a suction inlet, a handle secured to said cap and serving to move the cleaner to and fro across the floor, a pipe rigidly connected to the tubular element at the end which houses the suction producing means, a floor tool carried at one end of said pipe, and a flexible tube communicating at one end with the suction inlet of said cap and adapted to be detachably connected at the other end to the pipe which carries the floor tool or to be separated from said pipe and moved freely with reference to the caddy for cleaning in various locations.

4. A suction cleaner including a hollow conduit, means, including an electric motor, for causing a flow of air through the conduit, a removable cap at the inlet end of said conduit, an air filtering bag attached to said cap and removable therewith, and means associated with said cap for controlling said motor, said means serving to break the circuit to said motor when the cap and bag are removed for emptying the bag.

5. A suction cleaner including a hollow conduit having an inlet for dust laden air, motor actuated means for producing suction within the conduit, a removable cap assembly at the inlet portion of the conduit having a transparent window through which the entering air may be viewed, an electric lamp for illuminating the interior of the cap assembly, connected in circuit with the motor, said circuit including means for closing the circuit when the cap assembly is in position and for opening the circuit when the cap is removed from the conduit.

6. A suction cleaner including a conduit having an inlet for dust laden air, motor actuated means for producing suction within the conduit, a removable cap assembly at the inlet portion of the conduit having a transparent window through which the entering air may be viewed, an electric lamp for illuminating the interior of the cap assembly, connected in circuit with the motor, said circuit including a circuit breaker which is closed when the cap assembly is in position and is opened when the cap is removed from the conduit, one point of the circuit breaker being carried by the cap assembly and the other by the conduit.

7. A suction cleaner including a fiber tube housing air filtering means at one end and suction producing means, including an electric motor, at the other, a removable cap at the air filtering end, a two-part switch for making and breaking a circuit including said motor carried by said cap and fiber tube respectively, the circuit being completed through a wire through the interior of said fiber tube to said motor.

8. A suction cleaner including a tubular element, means, including an electric motor, for producing suction within said conduit, filtering means within the conduit, a transparent cap for said tubular element through which the filtering means may be viewed, a handle carried by said cap, a circuit including said motor, and a two part plug and socket switch in said circuit, one part being carried by the cap and the other by said tubular element, and serving to control, make or break the circuit to said motor, said switch members when assembled serving to accurately place the cap upon the caddy so that the handle grip will be in a position not to interfere with the visibility of the transparent cap to the operator.

9. In a suction cleaner, a housing containing an electrically driven suction producing power plant at one end and an air filtering bag at the other, a removable cap at the air filtering end, to which the bag is attached, a rigid handle carried by the cap, a transparent cover for said cap whereby the entering dust may be viewed, an electric light carried by said cap for illuminating the interior thereof, and an electric conductor cord extending lengthwise of said handle for supplying current to said lamp and having an extension for supplying current to said power plant.

DANIEL BENSON REPLOGLE.